United States Patent [19]

Wang et al.

[11] 4,339,760

[45] Jul. 13, 1982

[54] MAGNETIC PRINTING HEAD HAVING A HIGH SIGNAL-TO-NOISE RATIO

[75] Inventors: Jish M. Wang; Richard O. McCary, both of Schenectady, N.Y.

[73] Assignee: General Electric Company, Schenectady, N.Y.

[21] Appl. No.: 241,261

[22] Filed: Mar. 6, 1981

Related U.S. Application Data

[63] Continuation of Ser. No. 91,528, Nov. 5, 1979, abandoned.

[51] Int. Cl.[3] ...................... G01D 15/12; G03G 19/00

[52] U.S. Cl. .................................... 346/74.5; 360/66; 360/123; 365/214

[58] Field of Search ................ 346/74.5; 360/66, 115, 360/110, 123; 365/214, 48

[56] References Cited

U.S. PATENT DOCUMENTS

| | | | |
|---|---|---|---|
| 3,946,404 | 3/1976 | Berkowitz et al. | 346/74.5 |
| 4,001,841 | 1/1977 | Berkowitz | 346/74.5 |
| 4,097,871 | 6/1978 | Berkowitz | 346/74.5 |

*Primary Examiner*—Glen R. Swann, III
*Attorney, Agent, or Firm*—Alexander M. Gerasimow; James C. Davis, Jr.; Marvin Snyder

[57] ABSTRACT

The signal-to-noise ratio as measured by the ratio of the full select magnetic field levels to the half select magnetic field levels, is improved in a coincident current magnetic printing head by providing means for producing a bias magnetic field which is at least somewhat opposed to the signal magnetic fields.

10 Claims, 8 Drawing Figures

MAGNETIC PRINTING HEAD HAVING A HIGH SIGNAL-TO-NOISE RATIO

This application is a continuation, of application Ser. No. 091,528, filed Nov. 5, 1979, now abandoned.

BACKGROUND OF THE INVENTION

This invention relates to coincident current magnetic printing heads and in particular to magnetic printing heads having improved signal-to-noise ratios.

Coincident current magnetic printing heads generally depend for their operation on the simultaneous occurrence of electrical signal pulses through conductive signal lines disposed in the vicinity of one or more magnetic pole pieces. The magnetic pole pieces are generally placed in close proximity to a magnetic recording medium which moves relative to the printing head. The writing of information onto the recording medium requires the concurrent presence of two pulses or similar signals on the conductive signal lines. The magnetic pole pieces, signal lines, and current strengths are selected so that a current pulse on only one of the signal lines is of insufficient magnitude to write information onto the recording medium. This is referred to as the half-select condition. A full select condition occurs when both pulses are present simultaneously so that their effects are additive. Particularly in magnetic printing heads, there are a plurality of magnetic pole pieces which may be spaced at a resolution of one hundred dots per inch or more. The signal conductors associated with these linear arrays of pole pieces are organized into a word and digit structure. That is to say, adjacent sets of pole pieces are connected with a single word line conductor and with a plurality of digit line conductors. The writing of information onto the recording medium from any one of these adjacent poles pieces is accomplished by providing a half-select signal on the word line and a half-select signal on the desired digit line or digit lines. The positions associated with the pole pieces receiving only the half-select signal from the word lines receive no information; however, those positions associated with the magnetic pole pieces additionally receiving half-select signals through the digit lines, do receive the desired information.

Important in the selection of full select and half-select signal levels is the hysteresis curve for the magnetic material of the recording medium. This curve determines the ease of switching the magnetic flux in the medium and determines the signal levels employed. One of the drawbacks of the coincident current method is that increasing the signal strength to assure information transfer also increases the half-select signals so that there is no improvement in signal-to-noise ratio. Accordingly, the signal level cannot generally be increased without also increasing the noise level. Similar problems exist in the design of coincident current magnetic core memory systems.

While the present invention is applicable to any coincident currnt printing head including transverse heads, longitudinal heads, and perpendicular heads, the transverse, magnetic printing head disclosed in application Ser. No. 060,921, filed July 26, 1979, now abandoned is exemplary of the coincident current magnetic printing heads to which the present invention is directed. Accordingly, this aforementioned application is hereby incorporated herein by reference. Coincident current printing heads described in the prior art essentially comprise at least two printed circuit boards, each having an elongated gap therein across which the signal conductors pass. The printed circuit boards which typically comprise a flexible material such as Mylar$^R$ have their respective gaps aligned and are positioned so that the signal lines crossing the gaps are substantially parallel to and opposite corresponding signal lines on adjacent printed circuit boards. The magnetic pole pieces are provided by a magnetic comb-like structure. This structure typically comprises a material such as nickel-iron with teeth projecting along the long dimension thereof spaced to achieve approximately a resolution of 100 teeth per inch. The comb is disposed through the elongated gap in the printed circuit boards so that the comb teeth project between the parallel lines bridging the elongated gaps. An arched anodized aluminum support member is then employed to support the structure consisting of the printed circuit boards and the magnetic comb One of the printed circuit boards has disposed thereon the word signal lines and the other printed circuit board has disposed thereon the digit signal lines. An epoxy coating is then disposed over the arched surface and subsequently ground and polished to produce a smooth surface for contacting the recording medium. Such a structure may also include a third printed circuit board with conductive lines which serve only as a sacrificial layer during the grinding operation. Like other coincident current magnetic printing head structures, this configuration also suffers from the aforementioned signal-to-noise problem.

SUMMARY OF THE INVENTION

In accordance with a preferred embodiment of the present invention, a magnetic printing head with a high signal-to-noise ratio comprises a magnetic comb structure with coincident current means operating to produce a signal magnetic field between selected adjacent pairs of comb teeth. The coincident current means operates by energizing a selected pair of electrical conductors disposed between the comb teeth. Furthermore, the printing head of the present invention includes bias means operating to produce a magnetic field at least between the selected pair of projections, this bias magnetic field being somewhat opposed to the signal magnetic field. This bias magnetic field may be provided by a current carrying conductor or by a permanent magnet. As will be more particularly described below, the strength of the biased magnetic field is chosen so as to increase the ratio of the resultant full select magnetic field strength to the resultant half-select magnetic field strength. By providing this bias magnetic field, it is possible to increase the resultant signal strength while increasing the ratio between the signal strength to the noise level.

Accordingly, it is an object of the present invention to provide a coincident current magnetic printing head in which there is present a bias magnetic field for the purpose of increasing the signal-to-noise level ratio.

DETAILED DESCRIPTION OF THE INVENTION

Figure 1:
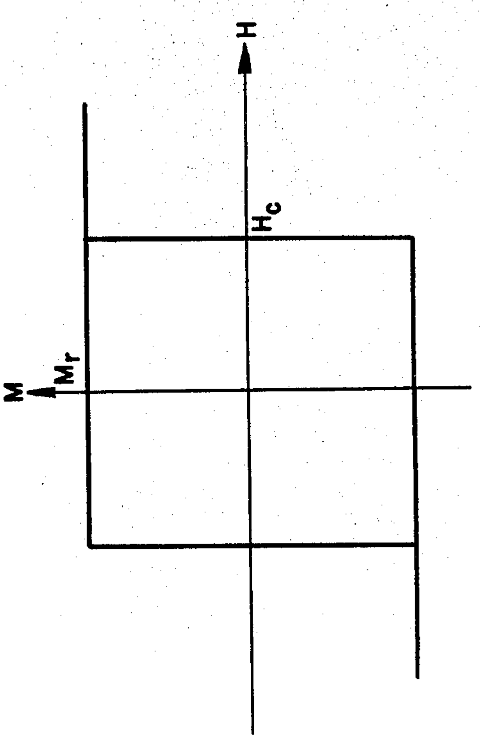
FIG. 1 is a plot of the hysteresis loop for an ideal magnetic recording medium.
Figure 2:
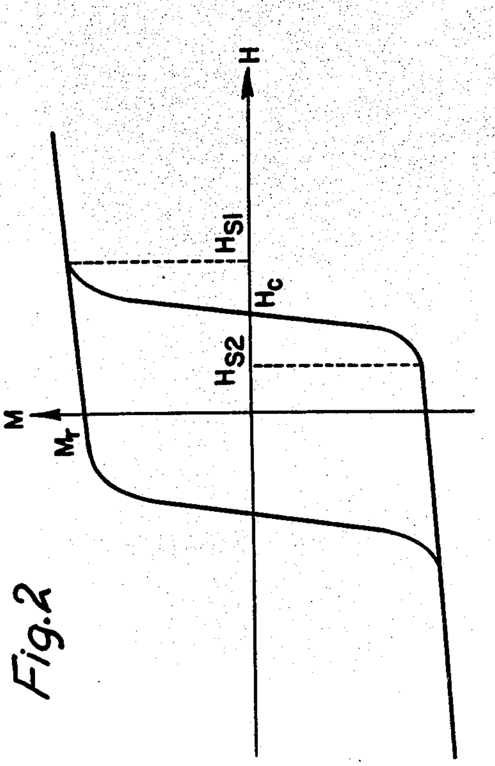
FIG. 2 is the plot of the hysteresis loop for a typical magnetic recording medium.

FIG. 1 shows the hysteresis curve for an ideal magnetic tape medium. Shown here are plotted the magnetization M versus the magnetizing field H. The ideal remanent magnetization is shown as $M_r$ in the figure. Also shown is the critical magnetic field strength $H_c$, which represents the applied magnetic field strength at zero magnetization. However, actual hysteresis loop curves for typical magnetic materials are much more closely approximated by the hysteresis curve shown in FIG. 2 which permits a more realistic description of several other variables. In particular, $H_{S2}$ is the magnetic field strength which must be exceeded to initiate switching of the magnetic domains on the recording medium and $H_{S1}$ is the magnetic field strength required to achieve complete switching. Furthermore, if $H_r$ represents the full select recording field strength and if $H_{dh}$ represents the digit half-select field strength and $H_{wh}$ represents the word half-select field strength, then completely satisfactory operating conditions for a coincident current printing head are described by the following three equations:

$$H_r = H_d + H_w \geqq H_{S1} \quad (1)$$

$$H_{dh} = H_d \leqq H_{S2} \quad (2)$$

$$H_{wh} = H_w \leqq H_{S2} \quad (3)$$

In the above, $H_d$ and $H_w$ represent the applied fields and $H_{dh}$ and $H_{wh}$ represent the resultant magnetic field strength (as seen in the recording medium) under digit half-select conditions and word half-select conditions, respectively. For ideal magnetic tape with ideal hysteresis loop characteristics, as shown in FIG. 1, $H_{S1}$ and $H_{S2}$ are the same and both are equal to $H_c$. The above operating conditions are easily satisfied by selecting $H_d$ and $H_w$ to be slightly less than $H_c$. However, the actual hysteresis loop characteristic is much more accurately described by FIG. 2 in which $H_{S1}$ is usually typically much larger than $H_c$ and $H_{S2}$ is much less than $H_c$. For example, $H_{S1}$ is approximately equal to 1.5 $H_c$ and $H_{S2}$ is approximately equal to 0.5 $H_c$. Because of these conditions, the most desirable operating conditions can never be completely satisfied and a compromise must be made in choosing the digit and word field strength levels. Equation (1) can be satisfied by selecting $H_d = H_w \geqq 0.75$ $H_c$. However, this results in high noise due to the high value of the resulting half-select field strength. On the other hand, if equations (2) and (3) are satisfied by choosing $H_d = H_w \leqq 0.5$ $H_c$, the recording field, $H_r$, which is equal to $H_d + H_w$, is less than or equal to $H_c$ and is not strong enough to achieve complete switching. The results in a low signal. Accordingly, the operating margin is generally very small and difficult to maintain.

In accordance with the preferred embodiment of the present invention, a third magnetic field component $H_b$, the reverse bias field is provided in addition to the digit and word fields. This improved method of addressing the magnetic print head array is referred to herein as the modified coincident current method. In this method, the resulting full select field $H_r$ is given by:

$$H_r = H_d + H_w - |H_b| \geqq H_{S1}. \quad (4)$$

Likewise the resulting digit half-select and word half-select field are given by:

$$H_{dh} = H_d - |H_b| \leqq H_{S2} \quad (5)$$

$$H_{wh} = H_w - |H_b| \leqq H_{S2} \quad (6)$$

Also indicated in the above equations are the inequalities which the resultant fields are required to satisfy. Additionally, it is required that $|H_b| \leqq H_{S2}$. It is easily seen that these conditions are satisfied if $H_d = H_w = H_c$, assuming that $H_{S1} = 1.5$ $H_c$ and $H_{S2} = 0.5$ $H_c$ and $|H_b| = 0.5$ $H_c$.

A brief comparison of the conventional addressing method and the modified coincident current addressing method disclosed herein is presented in Table I below. In the table, example 1 and 2 refer to the conventional coincident current method and examples 3 and 4 refer to the modified coincident current method of the present invention. For generality, the numbers are normalized with respect to $H_c$ as indicated in the column headings.

TABLE I

| | Signal Field | | | Resulting Fields | | |
|---|---|---|---|---|---|---|
| | $H_d/H_c$ | $H_w/H_c$ | $H_b/H_c$ | $H_r/H_c$ | $H_{dh}/H_c$ | $H_{wh}/H_c$ |
| Ex. 1 | 0.5 | 0.5 | — | 1.00 | 0.50 | 0.50 |
| Ex. 2 | 0.75 | 0.75 | — | 1.50 | 0.75 | 0.75 |
| Ex. 3 | 0.80 | 0.80 | −0.40 | 1.20 | 0.40 | 0.40 |
| Ex. 4 | 1.00 | 1.00 | −0.50 | 1.50 | 0.50 | 0.50 |

As can be seen in Examples 1 and 2 of the above table, the ratio of the full select signal $H_r$ to either of the half-select signals $H_{dh}$ or $H_{wh}$, is in both examples 2:1. While $H_r$ is relatively large in the second example, so is the half-select signal which significantly increases the likelihood that partial switching will produce unwanted signals on the recording medium. However, the ratios of the full select field strength to the half-select field strengths in Examples 3 and 4 in the above table are 3:1 in both examples. Even though both applied and digit word fields are higher and required a greater energy input, the resulting half select field strengths are significantly lower. It is clear that the modified coincident current method of the present invention greatly improves the signal-to-noise ratio.

This modified coincident current method is universal and can be applied to any coincident current printing head whether it is a transverse head, longitudinal head, or a perpendicular head. It is also equally applicable whether demagnitized tape or saturated tape is employed. Even though additional power is required to drive the digit and word line circuits and to provide power for the bias field, the power increase is not a significant problem either with respect to drive line circuitry or to print head overheating. The gain in signal-to-noise ratio and the greater flexibility in operating margin more than offset the increase in power dissipation.

Figure 3:
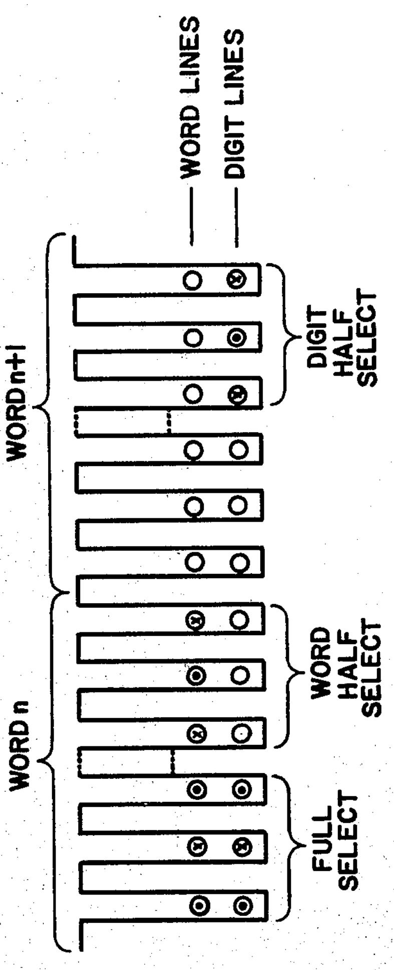
FIG. 3 is a schematic, cross-sectional view through the comb teeth showing the conductive word and digit lines passing therethrough.

FIG. 3 is a view through the comb teeth of a magnetic printing head. Two adjacent words are illustrated. Also shown are the cross sections of the current carrying conductors, the signal lines being disposed through the gaps in the comb teeth. Current direction flow is indicated by the conventional dot and cross vector symbols, the dot indicating a direction out of the sheet and the cross indicating a direction into the sheet. The first portion of word n illustrates the current conditions associated with a full select signal while the second portion of a word n illustrates the current conditions associated with a word half-select signal. The right most portion of word n+1 in FIG. 3 illustrates the current conditions which exist during application of the digit half-select signal. During a word half-select signal only the word lines through a given gap are activated. The digit lines are operated similarly during a digit half-select signal.

Figure 4:
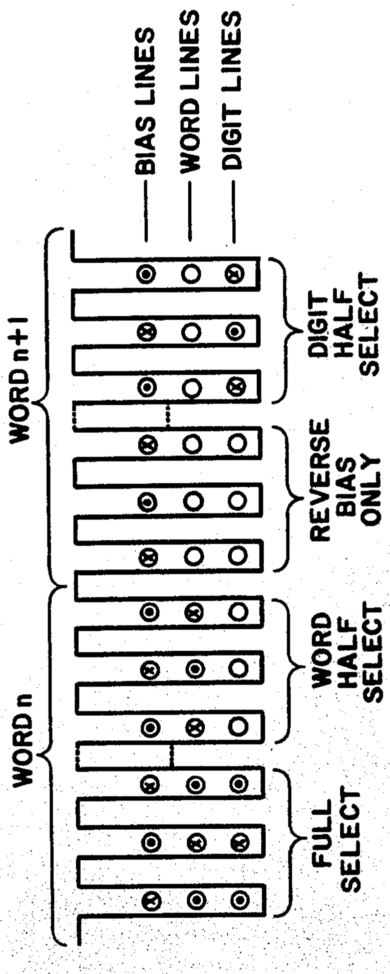
FIG. 4 is a view similar to FIG. 3 but including bias magnetic field conductors.

FIG. 4 illustrates a magnetic comb structure printing head employing the presnt invention in which there are incorporated bias signal lines for the purpose of supplying the aforementioned bias magnetic field. In this embodiment, each gap has disposed therein three conductive lines for producing independently the bias field, the word signal, and the digit signal. Using the same conventions as shown in FIG. 3, the first portion of word n indicates the current conditions present during the presence of a full select signal. During such a signal, the portion of the magnetic recording medium adjacent to the gaps between the teeth is impressed with a magnetic signal thereby transferring information to the recording medium. The last portion of word n illustrates the currnt conditions present during a word half-select signal. In these instances, it is easily seen that the bias magnetic field provides at least partial cancellation of a half-select signal and it is this effect which largely acts to reduce the noise during either digit or word half-select signals. Likewise, in FIG. 4, the last portion of word n+1 shows the current conditions present during a digit half-select signal. The first portion of n+1 illustrates the current conditions present when only the reverse bias field is active. The bias lines may be driven by a DC source or may be operated in a pulsed mode in conjunction with the word and digit line signal pulses. Moreover, in accordance with one embodiment of the invention, to be more particularly described below, the bias magnetic field may be provided by permanent magnet means.

Figure 6:
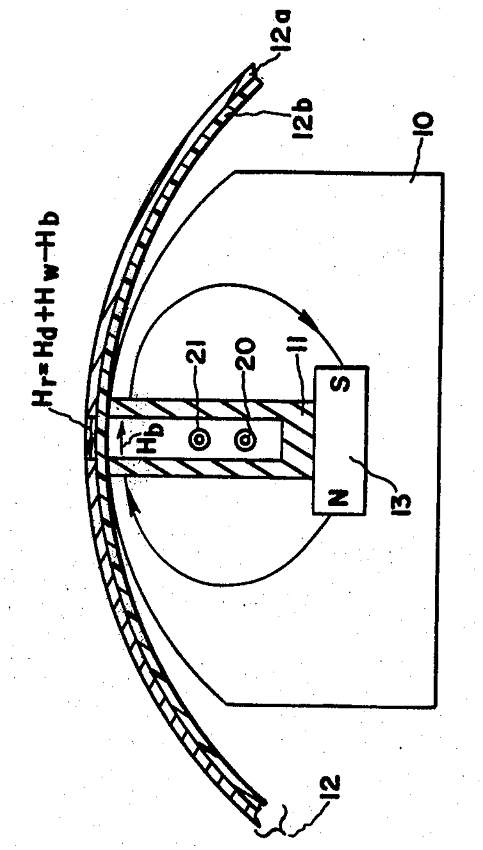
FIG. 6 is a view similar to that shown in FIG. 5 except that here the bias magnetic field is provided by a permanent magnet.
Figure 5:
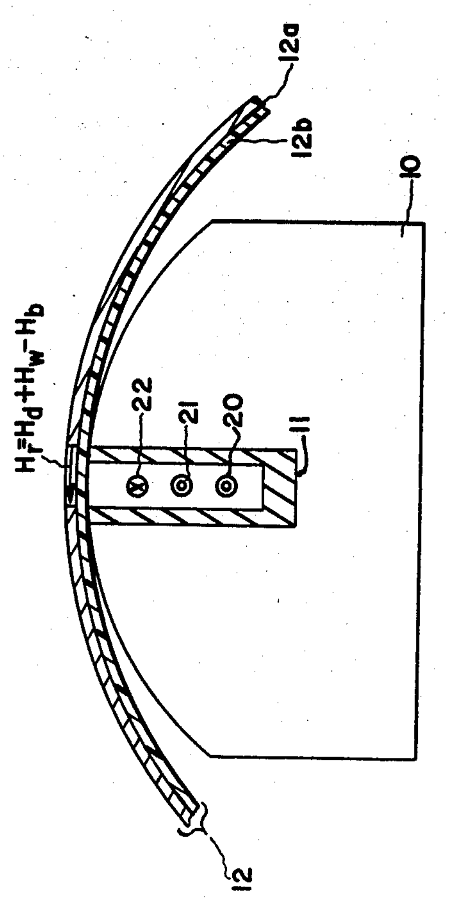
FIG. 5 is a cross-sectional side elevation view through a printing head of the present invention in which the bias magnetic field is provided by conductive signal lines.

FIG. 5 illustrates the relationship between the magnetic printing head of the present invention and the recording medium 12 which typically comprises a plastic backing layer 12*b* on which is disposed magnetic layer 12*a*. Disposed within recording head 10 there is shown a pair of magnetic comb teeth 11 through which bias line 22, word line 21, and digit line 20 pass. The size of the comb structure 11 in FIG. 5 is exaggerated for the purpose of illustration. Additionally, for purpose of illustraton only, the magnetic comb teeth are shown rotated 90° about the vertical axis. Similar conventions hold in FIG. 6. The arrow within the recording medium 12 of FIG. 5 indicates the resultant magnetic field written into the medium. This field is an algebraic sum of the fields produced by each of the conductors 20, 21, 22. In FIG. 6, the bias magnetic field is provided by permanent magnet 13 rather than by conductive line 22. However, the permanent magnet for providing the bias field is limited by practical considerations to low density print heads or to longitudinal print heads.

Figure 7:
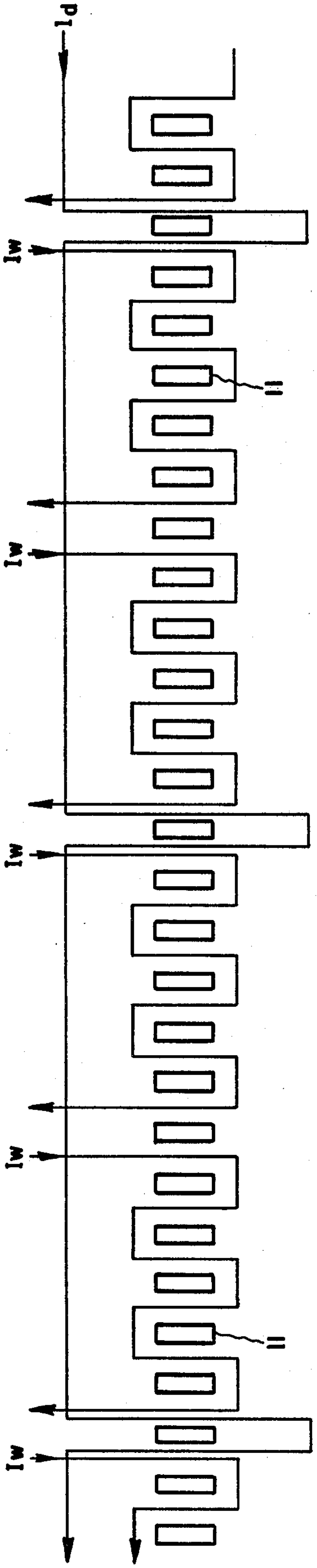
FIG. 7 is a schematic top view of the comb teeth showing digit and word line patterns in the vicinity of the comb teeth.

Related information on the configuration of the digit and word line patterns may be found in the aforementioned Berkowitz et al application which is assigned to the same assignee as the present invention. Nonetheless, for purposes of illustration, FIG. 7 illustrates the interrelationship between a plurality of word line patterns and a single digit line pattern. The current directions are selected for each of the circuits so that the digit and word signals produce reinforcing magnetic fields within the magnetic comb teeth 11 and the recording medium. The word line patterns are easily laid out in zig-zag paths as shown. The pattern for a plurality of digit line signal paths is similar except that there are a plurality of independent digit lines for each word, said plurality digit lines being laid out in a planar pattern.

Figure 8:
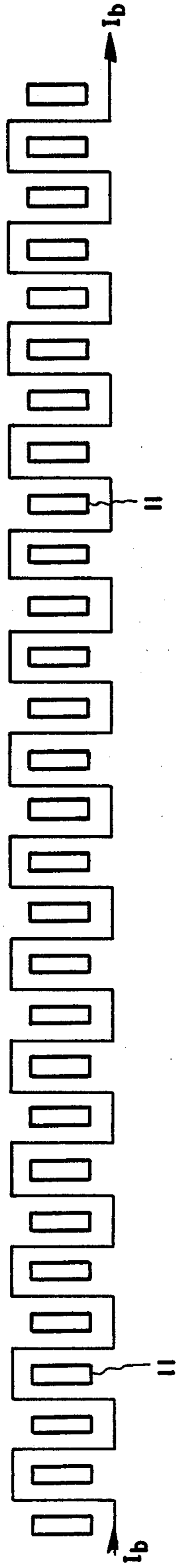
FIG. 8 is a view similar to FIG. 7 except that here the additional pattern for the bias magnetic field conductors are shown.

If the bias magnetic field of the present invention is provided by an electrical conductor, then a suitable conductor path and current direction through the comb teeth is illustrated in FIG. 8. In practice, the bias magnetic field lines, the word lines, and the digit lines are each contained on distinct printed circuit boards configured in a layered structure. Alternatively, two sets of conductive lines may be disposed on the front and back of a single printed circuit board. A magnetic printing head of the present invention would therefore incorporate all of the conductive lines shown in FIGS. 7 and 8. They are segregated here only for ease of understanding and description. Nonetheless, it is important to note that the word and bias magnetic field lines are oriented so as to have opposing effects. This fact is illustrated in FIGS. 7 and 8 by the current arrows associated with the word currents, $I_w$, the digit currents, $I_d$, and the bias magnetic field currents, $I_b$.

From the above, it may be appreciated that the modified coincident current printing head of the present invention significantly increases the signal-to-noise ratio in comparison with conventional magnetic printing heads. In particular, the ratio of the full select field strength to the half-select field strength is significantly increased. The improvement in signal-to-noise ratio is accomplished easily, either by permanent magnet means or by a single electrical conductor disposed through the gaps in the comb teeth of the printing head.

While the invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A magnetic printing head, having a high signal-to-noise ratio, for writing information on a magnetic recording medium moving relative to said head, said head comprising:

an elongate magnetic member having along the length thereof a plurality of regularly spaced projections, said member being composed of material having a high permeability;

means to produce a full select signal magnetic field between the tips of selected adjacent pairs of projections, said means being operated by energizing a pair of electrical conductors disposed between said selected projections, each of said conductors producing a half select signal magnetic field, the half-select magnetic fields combining to produce said full select signal magnetic field; and bias means operating to produce a bias magnetic field at least between said selected pairs of projections, said bias magnetic field being opposed to said full select and half select signal magnetic fields so as to increase the ratio of the resultant full select magnetic field strength to the resultant half-select magnetic field strength.

2. The printing head of claim 1 in which said magnetic recording medium exhibits a hysteresis loop having a zero magnetization value of $H_c$ and in which the magnitude of said bias field is approximately 0.5 $H_c$.

3. The printing head of claim 1 in which said bias means comprises at least one permanent magnet.

4. The printing head of claim 1 in which said bias means comprises an electrical conductor disposed between said projections and oriented to produce said opposing bias magnetic field.

5. The magnetic printing head of claim 1 further including support means for maintaining said magnetic member adjacent to said recording medium.

6. The printing head of claim 5 in which said support means comprises an elongate anodized aluminum block having an arched surface thereon, said elongate member being disposed along the peak of said arched surface.

7. The magnetic printing head of claim 1 in which said means to produce said signal magnetic fields and said means to produce said bias magnetic field comprise conductors mounted on at least one printed circuit board.

8. A magnetic print head, having a high signal-to-noise ratio, for recording information on a magnetic recording medium, said head comprising:

an elongated magnetic member having along the length thereof a plurality of spaced pole pieces, said member being composed of material having a high permeability;

said head requiring a full select signal magnetic field between selected adjacent pairs of pole pieces to effect such recording, a plurality of means each producing a partial select signal magnetic field between selected adjacent pairs of pole pieces, and means for combining a required plurality of such partial select magnetic field to produce said full select signal magnetic field; and bias means operating to produce a bias magnetic field at least between said selected pairs of pole pieces, said bias magnetic field being opposed to said combined partial select magnetic fields so as to increase the ratio of the resultant full select magnetic field strength to the resultant half select magnetic field strength.

9. The printing head of claim 8 in which said magnetic recording medium exhibits a hysteresis loop having a zero magnetization value of $H_C$ and in which the resultant magnitude of the combined partial select fields is approximately 1.0 $H_C$ and the bias magnetic field is approximately 0.5 $H_C$.

10. The printing head of claim 8 in which the difference between the half-select magnetic field and bias magnetic field has a resultant magnitude of approximately 0.5 $H_c$ and the maximum magnitude of the bias magnetic field is approximately 0.5 $H_c$.

* * * * *